(12) United States Patent
Chen

(10) Patent No.: US 11,507,651 B2
(45) Date of Patent: Nov. 22, 2022

(54) METHOD FOR AUTHORIZING OPERATION PERMISSIONS OF FORM-FIELD VALUES

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

(*) Notice: Subject to any disclaimer, the term of this patent is extended or adjusted under 35 U.S.C. 154(b) by 282 days.

(21) Appl. No.: 16/628,551

(22) PCT Filed: Jun. 28, 2018

(86) PCT No.: PCT/CN2018/093432
§ 371 (c)(1),
(2) Date: Jan. 3, 2020

(87) PCT Pub. No.: WO2019/007260
PCT Pub. Date: Jan. 10, 2019

(65) Prior Publication Data
US 2020/0218796 A1    Jul. 9, 2020

(30) Foreign Application Priority Data
Jul. 5, 2017 (CN) .......................... 201710543859.0

(51) Int. Cl.
*G06F 21/45* (2013.01)
*G06F 40/174* (2020.01)

(52) U.S. Cl.
CPC ............ *G06F 21/45* (2013.01); *G06F 40/174* (2020.01); *G06F 2221/2141* (2013.01); *G06F 2221/2145* (2013.01)

(58) Field of Classification Search
CPC .......... G06F 21/00; G06F 21/45; G06F 21/62; G06F 21/6218; G06F 21/6227;
(Continued)

(56) References Cited

U.S. PATENT DOCUMENTS 7,703,021 B1    4/2010  Flam
7,734,999 B2*   6/2010  Leung ................... G06F 40/174
                                                    715/222

(Continued)

FOREIGN PATENT DOCUMENTS

CN    101299694    11/2008
CN    101520875    9/2009
(Continued)

OTHER PUBLICATIONS

International Search Report in the international application No. PCT/CN2018/093432, dated Sep. 29, 2018.
(Continued)

*Primary Examiner* — Daniel B Potratz
(74) *Attorney, Agent, or Firm* — Ladas & Parry, LLP

(57) ABSTRACT

A method for authorizing operation permissions of form-field values is disclosed in the present invention, including a step of authorizing operation permissions of form-field values and a step of selecting a grantee; the step of authorizing operation permissions of form-field values includes: S1: selecting a form to be authorized, and displaying fields in the form that need operation permission control; and S2: authorizing the operation permissions to each value of the fields respectively, where the grantee is one or more roles, the role is an independent individual rather than a group or class, one role can only be related to a unique user during the same period, and one user is related to one or more roles. The present invention can achieve respective authorization for the operation permissions of form-field values, and
(Continued)

improves the fineness of system management. In this method, multiple authorized roles can be selected at the same time to batch authorization, thus improving the authorization efficiency. In addition, this method supports template authorization. Two methods are combined, so that the authorization efficiency of operation permissions of form-field values in a system is greatly improved.

10 Claims, 5 Drawing Sheets

(58) Field of Classification Search
CPC ............ G06F 16/24547; G06F 40/174; G06F 2221/2141; G06F 2221/2145
See application file for complete search history.

(56) References Cited

U.S. PATENT DOCUMENTS

| | | | |
|---|---|---|---|
| 2004/0006594 | A1 | 1/2004 | Boyer |
| 2011/0162046 | A1 | 6/2011 | Forster |
| 2011/0246867 | A1* | 10/2011 | Tsutsumi ............. G06F 40/174 715/222 |
| 2012/0036263 | A1 | 2/2012 | Madden |
| 2012/0317621 | A1 | 12/2012 | Mihara |
| 2018/0018448 | A1* | 1/2018 | Schulze ................ G06F 21/45 |
| 2020/0184091 | A1 | 6/2020 | Chen |

FOREIGN PATENT DOCUMENTS

| | | |
|---|---|---|
| CN | 102004868 | 4/2011 |
| CN | 102567675 | 7/2012 |
| CN | 102779040 | 11/2012 |
| CN | 102902767 | 1/2013 |
| CN | 102932340 | 2/2013 |
| CN | 103699565 A | 4/2014 |
| CN | 104091130 | 10/2014 |
| CN | 104091130 A | 10/2014 |
| CN | 104463005 | 3/2015 |
| CN | 104838386 | 8/2015 |
| CN | 105630759 | 6/2016 |
| CN | 105653977 | 6/2016 |
| CN | 105868357 | 8/2016 |
| CN | 107292588 | 10/2017 |
| CN | 107315931 A | 11/2017 |
| JP | 2010-020525 | 1/2010 |
| KR | 2016-0084997 | 7/2016 |
| WO | WO-2011092686 A1 * | 8/2011 ............. G06F 21/45 |

OTHER PUBLICATIONS

Written Opinion of the International Searching Authority in the international application No. PCT/CN2018/093432, dated Sep. 29, 2918 with English translation provided by Google Translate.
Office action from Chinese Patent Application No. 201810689172.2 dated Jun. 9, 2020 with search report, and its English translation from Global Dossier.
Office action from Chinese Patent Application No. 201810689172.2 dated Jan. 11, 2021, and its English translation from Global Dossier.
Reexamination Decision from Chinese Patent Application No. 201810689172.2 dated Sep. 9, 2021, and its English translation using Microsoft Word.
Notification of Grant from Chinese Patent Application No. 201810689172.2 dated Sep. 28, 2021, and its English translation from Global Dossier.
Office action from Chinese Patent Application No. 201810712691.6 dated Apr. 24, 2020 with search report, and its English translation from Global Dossier.
Office action from Chinese Patent Application No. 201810712691.6 dated Dec. 9, 2020, and its English translation using Microsoft Word.
Notification of Grant from Chinese Patent Application No. 201810712691.6 dated Mar. 16, 2021, and its English translation from Global Dossier.
Office Action from U.S. Appl. No. 16/627,990 dated Apr. 13, 2022.
International Search Report in the international application No. PCT/CN2018/093815, dated Sep. 21, 2018.
Written Opinion of the International Searching Authority in the international application No. PCT/CN2018/093815, dated Sep. 21, 2018 and English translation provided by Google Translate.
PCT International Preliminary Report on Patentability (Chapter II) from PCT/CN2018/093815 dated Oct. 14, 2019.
PCT International Preliminary Report on Patentability (Chapter II) from PCT/CN2018/093432 dated Oct. 18, 2019, and its English translation from WIPO.

* cited by examiner

| | Recent authorization operator: Li Si; Operation time: 11:00 on May 21, 2015 | | | | |
|---|---|---|---|---|---|
| General Manager Office<br>✓ Clerk 1 (Zhang San)<br>Clerk 2 (Li Er)<br>Clerk 3 (Wang Wu)<br>xxx xxx | Form selection | Field-value operation permission authorization | | | |
| | Customer contract ✓ order<br>xxx xxx | Field name | View | Modify | ××× ××× |
| | | Order number | ✓ | ✓ | |
| | | Customer name | ✓ | ✓ | |
| | | Customer address | ✓ | ✓ | |
| | | Phone number | | | |
| | | Contact | | | |
| | | Industry of the customer | ✓ | ✓ | |
| | | Product model | ✓ | ✓ | |
| | | Product quantity | ✓ | ✓ | |
| | | Product unit price | ✓ | | |
| | | ... | | | |

FIG. 5

| | Recent authorization operator:; Operation time: | | | | |
|---|---|---|---|---|---|
| | Form selection | Field-value operation permission authorization | | | |
| General Manager Office<br>✓ Clerk 1 (Zhang San)<br>✓ Clerk 2 (Li Er)<br>　Clerk 3 (Wang Wu)<br>……… | Customer contract<br>✓ order<br>……… | Field name | View | Modify | …… |
| | | Order number | | | |
| | | Customer name | | | |
| | | Customer address | | | |
| | | Phone number | | | |
| | | Contact | | | |
| | | Industry of the customer | | | |
| | | *Product model* | | | |
| | | *Product quantity* | | | |
| | | *Product unit price* | | | |
| | | … | | | |

FIG. 6

| General Manager Office<br>✓ Clerk 1 (Zhang San)<br>Clerk 2 (Li Er)<br>Clerk 3 (Wang Wu)<br>... ... | Recent authorization operator: Li Si; Operation time: 11:00 on May 21, 2015 ||||
|---|---|---|---|---|
| | Authorization template: created template 1 ||||
| | Form selection | Field-value operation permission authorization ||||
| | Customer contract ✓ order ... ... | Field name | View | Modify | ... ... |
| | | Order number | ✓ | ✓ | |
| | | Customer name | ✓ | ✓ | |
| | | Customer address | ✓ | ✓ | |
| | | Phone number | | | |
| | | Contact | | | |
| | | Industry of the customer | ✓ | ✓ | |
| | | Product model | ✓ | ✓ | |
| | | Product quantity | ✓ | ✓ | |
| | | Product unit price | ✓ | | |
| | | ... | | | |

FIG. 7

Order form

Order number DD201700005    Customer name Chengdu Aircraft Industrial (Group) Co., Ltd.
Customer address Qingyang District, Chengdu    Phone number **************
Contact ************    Industry of the customer High-end manufacturing Detail list

| Product model | Product quantity | Product unit price | ...... |
|---|---|---|---|
| A001 | 1000 | 50 | |
| A002 | 1500 | 20 | |
| A003 | 1000 | 20 | |
| A004 | 500 | 150 | |
| xxxxxx | | | |

FIG. 8

METHOD FOR AUTHORIZING OPERATION PERMISSIONS OF FORM-FIELD VALUES

CROSS-REFERENCE TO RELATED APPLICATIONS

This application is the U.S. national phase of PCT/CN2018/093432, filed on Jun. 28, 2018, which claims priority to Chinese Application No. 201710543859.0 filed on Jul. 5, 2017, the disclosures of which are incorporated by reference herein in their entireties.

BACKGROUND

Technical Field

The present invention relates to a form-authorized method in management software such as ERP, and in particular, to a method for authorizing operation permissions of form-field values.

Related Art

In a conventional software system, form viewing permissions can be authorized respectively based on form-field values. For example, the type of a selected form is "order", and the fields to be authorized under control in the form are "order number", "customer name", "customer address", "phone number", "contact", "industry of the customer", "product model", "product quantity", "product unit price", and the like. It allows users of a system to control the viewing permissions of different order information in the order form respectively. For example, the system user is allowed to view the customer name in the order form, and is not allowed to view the phone number in the order form. However, the conventional software system has the following defects: (1) While authorizing a form-field value, an operator and operation time in the last authorization cannot be displayed; when an error occurs in the form permission authorization, it is impossible to hold accountability or provide a current authorization operator with an authorization time for reference, which makes usage inconvenient. (2) Operation permissions of form-field values cannot be authorized to multiple roles in batch, and a template authorization function is not supported either. The fields need to be set one by one in each authorization, which results in relatively low authorization efficiency. There are usually an extremely large number of form-fields in a large-scale software system, and the conventional authorization method involves a tremendous workload.

In addition, role-based access control (RBAC) is one of the most researched and mature permission management mechanisms for databases in recent years. It is considered to be an ideal candidate to replace conventional mandatory access control (MAC) and discretionary access control (DAC). Conventional discretionary access control has high flexibility but low security. Mandatory access control is highly secure but too restrictive. Role-based access control combines both above, and not only is easy to manage, but also reduces complexity, costs, and probability of errors. Therefore, it has been greatly developed in recent years. The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user one-to-many" relation mechanism, where the "role" has the nature of a group or class. That is, one role can simultaneously correspond to or be related to multiple users, and the role is similar to a post or a position or a type of work or other concepts. The permission authorized to a user under this relation mechanism is basically divided into the following three forms: 1. As shown in FIG. 1, the permission is directly authorized to the user, where the disadvantage is that the workload is large and the operation is frequent and cumbersome. When changes on the employee have occurred (such as transfer or resignation), all form operation permissions related to the employee shall be adjusted accordingly. Especially, for administrators in a company, many form permissions are involved. As the permission adjustment involves large workloads and is cumbersome, and errors or omissions are likely to occur, affecting the normal operation of the enterprise and even causing unpredictable losses.

2. As shown in FIG. 2, the role (having the nature of a class/a group/a post/a type of work) is authorized (one role may be related to multiple users), the user obtains permissions through its role, and the approval operator is the role that has the nature of a group or class. 3. As shown in FIG. 3, the above two methods are combined.

In the above descriptions, as both 2 and 3 need to authorize the role that has the nature of a class or group. The way of authorization and workflow control through the role having the nature of a class/a group/a post/a type of work has the following disadvantages: 1. Operations are difficult when the user's permission has changed. In the actual process of using a system, the user's permissions often need to be adjusted during the operation process. For example, in processing of the change in an employee's permissions, when the permissions of an employee related to the role have changed, it is improper to change the permissions of the entire role due to the change in the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

When the form operation permissions of the employee or user have changed, either the employee or the user is disengaged from the role, or a new role is added to meet the requirements of work. The defect of the first way is the same as that of the foregoing method of "direct authorization to the user". In the second way, adding a new role involves creation, relation, and authorization of the role. Especially when there are many roles and many users related to the roles, it is difficult to remember which users are related to the role.

2. It is difficult to remember the specific permissions contained in a role for a long time. If the role has many permission function points, as time goes by, it is difficult to remember the specific permissions of the role, and it is even more difficult to remember the permission differences between roles with similar permissions. The permissions of similar roles are also easily confusable. If a new user needs to be related, it is impracticable to accurately determine how to select a relation.

3. Because user permissions change, more roles will be created (if new roles are not created, direct authorization to the user will be increased greatly), and it is more difficult to distinguish specific differences between permissions of the roles.

4. When a user is transferred from a post, if many permissions of the transferred user need to be assigned to other users, distinguishing the permissions of the transferred user and creating roles to relate to the other users respectively are necessary during the processing. Such operations are not only complicated and time-consuming, but also prone to errors.

SUMMARY

Technical Problems

The object of the present invention is to overcome the deficiencies of the prior art, and provide a method for authorizing operation permissions of form-field values, to achieve respective authorization for the operation permissions of form-field values, and improve the fineness of system management. One role can only be related to a unique user during the same period. The efficiency of permission management in using the system is greatly improved, so that the dynamic authorization is made simpler, more convenient, clearer and more explicit, thus improving the efficiency and reliability of permission authorization.

Solutions to Problems

Technical Solutions

The object of the present invention is achieved by the following technical solutions: A method for authorizing operation permissions of form-field values includes a step of authorizing operation permissions of form-field values and a step of selecting a grantee, wherein there is no sequence relation between the step of authorizing operation permissions of form-field values and the step of selecting a grantee. The step of authorizing operation permissions of form-field values includes the following steps: S1: selecting a form to be authorized, and displaying fields in the form that need operation permission control; and S2: authorizing the operation permissions to each value of the fields respectively; said grantee is one or more roles, said role is an independent individual rather than a group or class, one role can only be related to a unique user during the same period, and one user is related to one or more roles.

Said operation permission includes one of or both a viewing permission and a modification permission.

Display modes of a field value that does not have the viewing permission include: (1) displaying a field corresponding to the field value, but hiding the field value by using a hiding symbol; and (2) displaying neither the field value nor the field corresponding to the field value.

There is one and only grantee selected, and when a form to be authorized is selected, an operator who authorizes field values of the form to the grantee recently and operation time are displayed.

Said role belongs to a department, the role is unique under the department, the role is authorized according to work content of the role, and a user obtains permissions through the related role.

A name of said role is unique under the department, and a number of the role is unique in a system.

During cross-department transfer of a user, the user's relation to the role in the original department is canceled, and then the user is related to a role in a new department.

The method for authorizing operation permissions of form-field values further includes a template authorization step that specifically includes: (1) selecting an grantee and an authorized form, where one or more roles are selected as the grantee; (2) authorizing the grantee: selecting an existing role or a created template as an authorization template, and giving the operation permissions of form-field values in the authorization template to the grantee; and (3) obtaining the operation permissions of form-field values of the grantee after the operation permissions are saved with or without modification.

A method for authorizing operation permissions of form-field values includes a step of authorizing operation permissions of form-field values and a step of selecting a grantee, wherein there is no sequence relation between the step of authorizing operation permissions of form-field values and the step of selecting a grantee; the step of authorizing operation permissions of form-field values includes the following steps: S1: selecting a form to be authorized; S2: selecting an operation permission to be authorized; and S3: setting a field in a form that has the selected operation permission, so that the set field has the selected operation permission (that is, having a corresponding operation permission of a field value of the field); said grantee is one or more roles, said role is an independent individual rather than a group or class, one role can only be related to a unique user during the same period, and one user is related to one or more roles.

Beneficial Effects of the Invention

Beneficial Effects

The present invention has the following beneficial effects:
1) The present invention can achieve respective authorization for the operation permissions of form-field values, thus improving the fineness of system management. The operation permissions include a viewing permission and a modification permission, which is especially suitable for the case that it needs to authorize the field values of form fields respectively. For example, in an order form, a certain system role is allowed to view "order number", "customer name", "customer address", "industry of the customer", "product model", "product quantity", and "product unit price", but is not allowed to view the content (that is, field values) of sensitive fields such as "phone number" and "contact". Through this method, respective authorization can be achieved rapidly. For another example, a system role is allowed to view the content of "product unit price" field but is not allowed to modify the content of the "product unit price" field, and this method can also achieve the permission setting rapidly.

2) When there is one and only grantee selected and a form to be authorized is selected, an operator who authorizes the operation permissions of field values of the form to the grantee recently and an operation time are displayed. Displaying the recent operator helps track accountability when an error occurs in authorizing the permissions of form-field values, and displaying the recent operation time helps determine intuitively whether the form-field value needs to be re-authorized.

For example, Li Si completed the last operation of authorizing the operation permissions of field values of a contract form to a grantee Zhang San at 11:00 on May 21, 2015. When Zhang San is selected as the grantee and the contract is selected as a form to be authorized, it is displayed for the current authorization operator that the last contract form authorization was performed by Li Si at 11:00 on May 21, 2015 for Zhang San.

If Zhang San should not have the permission to view the content of a confidential field, but obtained the permission to view the content of the confidential field in the last authorization to Zhang San, those responsible can be found by searching for the last authorization operator in a subsequent accountability tracking process.

For another example, an operator needs to authorize field values of a contract form to 100 grantees; however, the operator only finished authorizing to 70 grantees on that day. When the operator continued to authorize on the next day, the operator may view the last authorization time of each grantee to determine whether the grantee needs to be authorized. Alternatively, according to a time interval of authorization, all grantees that are authorized in a specified time interval can be found. By viewing the last time that a grantee was authorized, it can be known how long the grantee's permissions have remained unchanged, which helps determine intuitively whether to re-authorize the grantee.

3) In this method, multiple authorized roles can be selected at the same time to batch authorization, thus improving the authorization efficiency. In addition, this method supports template authorization, that is, selecting an existing role or a created template as an authorization template, and directly giving the (updating) operation permissions of form-field values in the authorization template to the grantee (saved after simple modification). The authorization operation is simple and efficient. Two methods are combined, so that the authorization efficiency of operation permissions of form-field values in a system is greatly improved.

4) In the present application, the role is in one-to-one relation to the user. One role can only be related to a unique user during the same period, and one user is related to one or more roles. The advantage thereof is that the permissions can be obtained as long as the user is related to the role (that is, the user obtains the permissions of its related role), and changes in the role's permissions are much fewer than the changes in the user's permissions in a conventional mechanism. As there are few changes in the quantity of roles having the nature of an independent individual (the nature of a post number or a work station number), despite large turnover of employee, few changes occur in the post number/work station number (even there is no change within a certain period, that is, the role does not change). This greatly simplifies user's permission management and reduces system overheads.

5) The operations such as dynamic management, recruitment, and transfer are simple, convenient, efficient and highly reliable. The application of recruitment or resignation or transfer in the permission management is simple. When an employee or a user has changed, it is unnecessary to reset permissions. It is only necessary for a user to cancel the relation or be related to the role. For the user who is no longer in the role, the relation to the role is canceled; and the user who takes over the role is related to the role of the post number. The user related to the role automatically obtains the related tasks and the operation permissions of that role, without re-authorizing the role, thus greatly improving the efficiency, security, and reliability of the system setting.

For example, because user Zhang San is transferred or resigns from a post, Zhang San no longer works as a role of "purchaser 3", and Zhang San then cancels the relation to "purchaser 3". Meanwhile, Li Si takes over the work as the role of "purchaser 3", and it only needs to relate Li Si to the role, so Li Si automatically obtains the operation permissions of form-field values of the role "purchaser 3".

6) The conventional permission management mechanism defines the role as the nature of a group, a type of work, a class or the like. The role is in a one-to-many relation to the user. In the actual process of using a system, the user's permissions often need to be adjusted during the operation process. For example, in processing of the change in an employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the object can be achieved by changing the role's permissions. Although the method in the present application seems to increase the workload during system initialization, by means of copying or the like, the role can be created or authorized more efficiently than the conventional roles having the nature of a group/a class. As it is unnecessary to consider the commonality of the roles having the nature of a group/a class when satisfying the related users, the solutions in the present application make the permission setting clear and explicit. Especially after the system has been used for a period of time (after the permissions of the user/role have changed dynamically), the solutions in the present application can significantly improve the efficiency of permission management for the system user in using the system, make the dynamic authorization simpler, more convenient, clearer and more explicit, and improve the efficiency and reliability of the permission setting.

7) The conventional role authorization method with the nature of a group/class is prone to errors. The method provided in the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role of the group nature, all users related to the role are affected. Even if the authorization errors occur, the correction method in the present application is simple and takes a short time, while in the case of the conventional role having the nature of a group, the commonality of the permissions of all users related to the role needs to be considered during the error correction. The modification is cumbersome, complex, and error-prone when the role has many function points, and in many cases, the problem cannot be solved unless a new role is created.

8) In the conventional group-based role authorization method, if the role has many permission function points, as time goes by, it is difficult to remember specific permissions of the role, and it is even more difficult to remember the permission differences between roles with similar permissions. If a new user needs to be related, it cannot be accurately determined how to select a relation. In the method of the present application, the role itself has the nature of a post number or work station number, such that the selection can be made easily.

9) When a user is transferred from a post, if many permissions of the transferred user need to be assigned to other users, in processing, distinguishing the permissions of the transferred user and creating roles to relate to other users respectively are necessary. The operations are complicated, time-consuming, and prone to errors.

The method in the present application is as follows: The transferred user is related to several roles. When the user is transferred, the relation between the user and the roles in the original department is first canceled (the canceled roles may be re-related to other users), and then the user is related to a role in a new department. The operation is simple and not error-prone.

BRIEF DESCRIPTION OF THE DRAWINGS

Description of the Drawings

Figure 1:
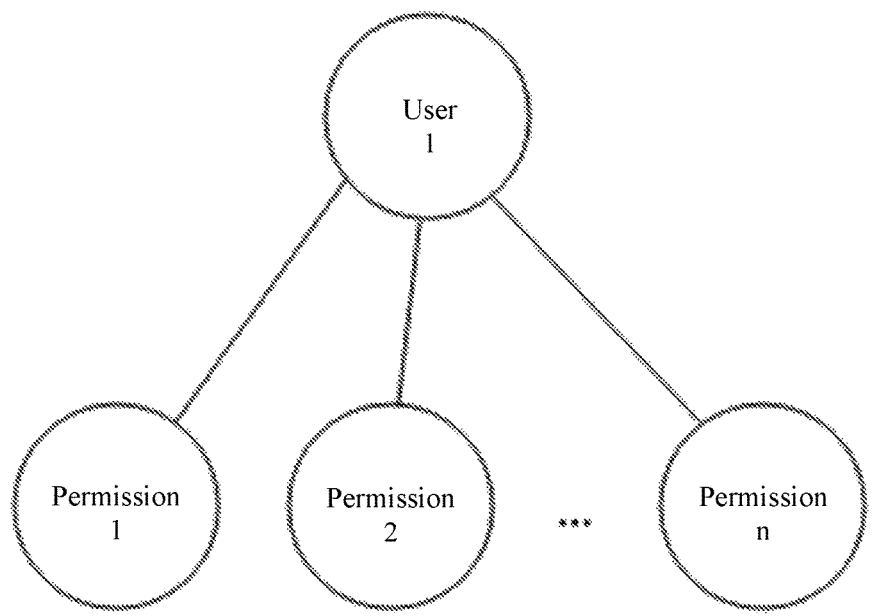
Figure 2:
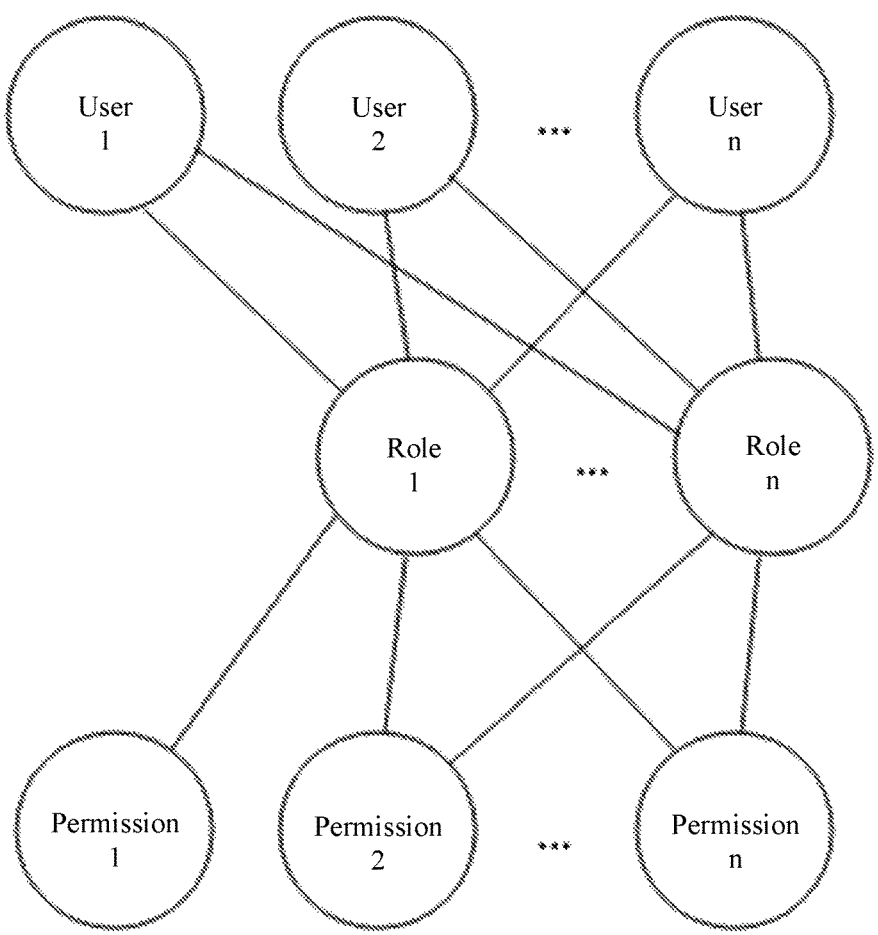
Figure 3:
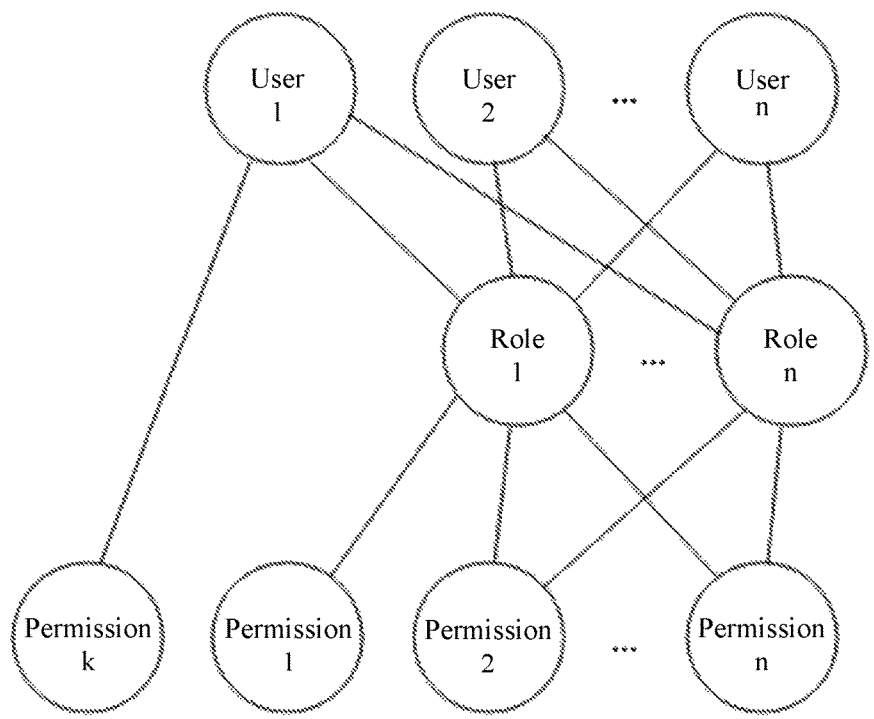
Figure 4:
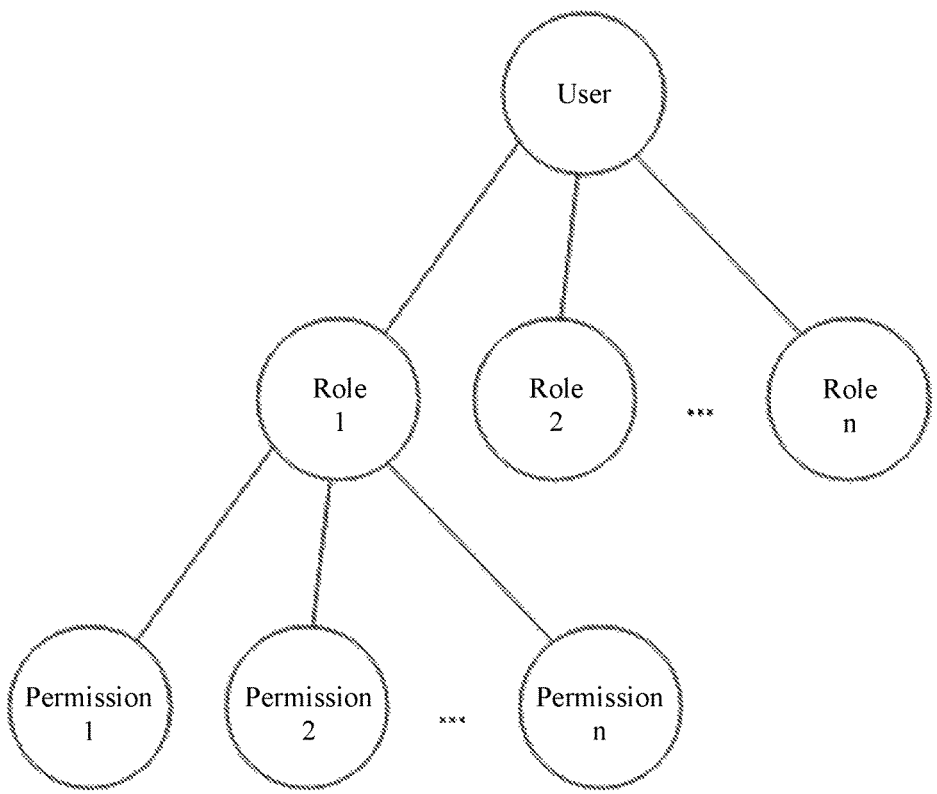

FIG. 1 is a schematic diagram in which a system directly authorizes a user in the prior art;

FIG. 2 is a schematic diagram in which a system authorizes a role having the nature of a group or class in the prior art;

FIG. 3 is a schematic diagram in which a system both directly authorizes a user and a role having the nature of a group or class in the prior art;

FIG. 4 is a schematic diagram in which a system authorizes a user through a role having the nature of an independent individual according to the present invention;

FIG. 5 is a schematic diagram when there is one selected grantee and a form is selected according to the present invention;

FIG. 6 is a schematic diagram when there are multiple selected grantees and a form is selected according to the present invention;

FIG. 7 is a schematic diagram when a grantee is authorized by using an authorization template according to the present invention; and FIG. 8 is a schematic diagram of an order form according to an embodiment of the present invention.

DETAILED DESCRIPTION

Description of Embodiments

The technical solutions of the present invention will be further described in detail below with reference to the figures, but the protection scope of the present invention is not limited to the following descriptions.

Embodiment 1

In this Embodiment, the Fields that Need Operation permission control are set first, and then the corresponding operation permissions are set.

A method for authorizing operation permissions of form-field values includes a step of authorizing operation permissions of form-field values and a step of selecting a grantee, wherein there is no sequence relation between the step of authorizing operation permissions of form-field values and the step of selecting a grantee; the step of authorizing operation permissions of form-field values includes the following steps: S1: selecting a form to be authorized, and displaying fields in the form that need operation permission control; and S2: authorizing the operation permissions to each value of the fields respectively (the fields that need operation permission control displayed in S1 are authorized, and it is considered by default that a field value of a field which is not displayed in S1 and does not need permission control has a viewing and/or modification permission), where the operation permission includes one of or both a viewing permission and a modification permission.

After the setting is completed, the grantee's permission to view or modify content (the field value) of each field in the form can be determined.

The present invention can achieve respective authorization for the operation permissions of form-field values, thus improving the fineness of system management. The operation permissions include a viewing permission and a modification permission, which is especially suitable for the case that it needs to authorize the field values of form-fields respectively. For example, in an order form, a system role clerk 1 (Zhang San) is allowed to view "order number", "customer name", "customer address", "industry of the customer", "product model", "product quantity", and "product unit price", but is not allowed to view the content (that is, field values) of sensitive fields such as "phone number" and "contact". Through this method, respective authorization can be achieved rapidly. For another example, the clerk 1 (Zhang San) is allowed to view the content of the "product unit price" field but is not allowed to modify the content of the "product unit price" field, and this method can also achieve the permission setting rapidly. A setting effect figure is as shown in FIG. 5.

In this embodiment, as shown in FIG. 4, the grantee is one or more roles, the role is an independent individual rather than a group or class, one role can only be related to a unique user during the same period, and one user is related to one or more roles. The role belongs to a department, the role is unique under the department, the role is authorized according to the work content of the role, and the user obtains permissions through the related role. The name of the role is unique under the department, and the number of the role is unique in a system. During cross-department transfer of the user, the user's relation to the role in the original department is first canceled, and then the user is related to a role in a new department.

In the following, the advantages of the method for authorizing operation permissions of field values to user through a role having the nature of an independent individual are analyzed: The user determines (obtains) permissions through its relation to the role. If the permissions of the user need to be modified, the permissions owned by the role are adjusted to achieve the object of changing the permissions of the user related to the role. Once the user is related to the role, the user owns all the operation permissions of the role.

A role is in a one-to-one relation to a user (when the role is related to one user, other users can no longer be related to that role; and if the role is not related to the user, the role can be selected to be related to other users; that is, in the same period, one role can only be related to one user). A user is in a one-to-many relation to roles (one user can be related to multiple roles at the same time).

Definition of a role: A role doesn't have the nature of a group/class/category/post/position/a type of work or the like, but is of a non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, roles to which Zhang San needs to be related are the deputy general manager 2 and the manager of Beijing sales department I, and Zhang San owns the permissions of the two roles.

The concept of conventional roles has the nature of a group/a class/a post/a position/a type of work, and one role can correspond to multiple users. However, in the present application, the concept of "role" is equivalent to a post number/work station number, and is also similar to the role in a film and a television drama: one role in the same period (in childhood, juvenile, middle-age . . . ) can be played by only one actor or actress at the same time, but one actor or actress may play multiple roles.

After the role is created, a user may be related to the role in the process of creating the user, or may be related to the role at any time after the user is created. After the user is related to the role, the user can be released from the relation to the role at any time, and the relation between the user and another role may be created at any time.

The role is composed of: a post name+a post number, for example, a workshop worker 1, a workshop worker 2, a workshop worker 3, and so on. The role is an independent individual, and is equivalent to a concept of a post number or a work station number, but different from the role in a conventional permission management system. The concept of the role in the conventional permission management system has the nature of a group or class such as a post, a position, a type of work or the like.

The following example shows the relationship among an employee, a user, and a role after Zhang San, an employee, enters a company as follows: 1. Recruiting: after the employee is recruited, the role of the corresponding post number or work station number is directly selected for the user (employee) to be related. For example, when Zhang San has joined the company (the company has assigned a user for Zhang San) and works at the sales department I to be responsible for sales of refrigerator products in Beijing area (the corresponding role is "sales engineer 5" under the sales department I), then the user Zhang San directly selects and is related to the role "sales engineer 5".

2. Adding position: After Zhang San has worked for a period of time, the company further arranges Zhang San to be responsible for sales of TV products in Beijing area (the corresponding role is "sales engineer 8" under the sales department I) and to serve as a supervisor of an after-sales department (the corresponding role is "after-sales department supervisor 1). Therefore, two roles, that is, "sales engineer 8" under the sales department I and "after-sales department supervisor 1" under the after-sales department, are additionally related to the user Zhang San. In this case, the employee Zhang San is related to three roles: "sales engineer 5" and "sales engineer 8" under the sales department I, and "after-sales department supervisor 1" under the after-sales department. Therefore, the user Zhang San owns the permissions of the three roles.

3. Reducing position: After a while, the company has decided to let Zhang San serve as an after-sales department manager (corresponding to a role "after-sales manager" under the after-sales department) without taking up other positions any more. Therefore, the user Zhang San is related to the role "after-sales department manager" under the after-sales department, and is released from the relation to the previous three roles ("sales engineer 5" and "sales engineer 8" under the sales department I, and "after-sales department supervisor 1" under the sales department). In this case, the user Zhang San owns only the permissions of the role "after-sales department manager" under the after-sales department.

4. Adjusting permissions of a role (adjusting the permissions of the role itself): if the company has decided to add permissions to the after-sales department manager, the permissions only need to be added to the role of the after-sales department manager. With the increase in the permissions of the role of the after-sales department manager, the permissions of the user Zhang San are also increased.

5. Resignation: After one year, Zhang San resigns. It is only necessary to cancel the relation between the user Zhang San and the role "after-sales department manager" under the after-sales department.

For example, during the dynamic operation of the company, recruiting and resigning of staff often occur continuously, but post numbers or work station numbers seldom change (or even remain unchanged within a period of time).

Conventional authorization method: In the case of a large quantity of system function points, authorizing the conventional roles that have the nature of a group or class involves a large and cumbersome workload and is very error-prone, and errors are not easily detectable in a short time and tend to cause loss to a system user.

Authorization method of the present application: in the present application, the authorization is made to the role having the nature of a post number or work station number in nature is authorized, and the user is related to the role to determine (obtain) permissions. Therefore, the permissions of the user are controlled by only a simple user-role relation. Controlling the permissions is simple, easily operable, clear, and explicit, thereby significantly improving the efficiency and reliability of authorization.

Embodiment 2

In this embodiment, one or more grantees may be selected, and only one form to be authorized can be selected. There is one and only grantee selected, and when a form to be authorized is selected, an operator and operation time that field values of the form are authorized to the grantee recently are displayed.

As shown in FIG. 5, when one grantee is selected and a form to be authorized is selected, an operator and operation time that field-value operation permissions of the form are authorized recently are displayed. A current state of the grantee's operation permissions for field values in the form is also displayed, and the current state is modified and saved to obtain new field-value operation permissions.

As shown in FIG. 6, when multiple grantees are selected and a form to be authorized is selected, the operator and the operation time that field-value operation permissions of the form are authorized recently are displayed as empty, and the state of the selected grantee's operation permissions for the field values in the form cannot be displayed either.

Displaying the recent operator helps track the accountability when an error occurs in authorizing permissions of form-field values, and displaying the recent operation time helps to determine intuitively whether the re-authorization of form-field value needs to be performed.

For example, Li Si completed the last operation of authorizing operation permissions of field values of a contract form to a grantee Zhang San at 11:00 on May 21, 2015. When Zhang San is selected as the grantee and a contract is selected as a form to be authorized, it is displayed for the current authorization operator that the last contract form authorization is performed by Li Si at 11:00 on May 21, 2015 for Zhang San.

If Zhang San should not have the permission to view the content of a confidential field, but the last authorization to Zhang San makes him own the permission to view the content of the confidential field, those responsible can be found by searching for the last authorization operator in a subsequent accountability tracking process.

For another example, an operator needs to perform authorization of field values of a contract form to 100 grantees; however, the operator only finished authorizing to 70 grantees on that day. When the operator continued to authorize on the next day, the operator may view the last authorization time of each grantee to determine whether the grantee needs to be authorized. Alternatively, according to a time interval of authorization, all grantees that are authorized in a specified time interval can be found. By viewing the last time that and a grantee was authorized, it can be known how long the grantee's permissions have remained unchanged, which helps determine intuitively whether to re-authorize the grantee.

Embodiment 3

In this embodiment, display modes of a field value that does not have the viewing permission include: (1) displaying a field corresponding to the field value, but hiding the field value by using a hiding symbol, where as shown in FIG. 8, fields "phone number" and "contact" are displayed but the content of the fields are hidden with the symbol *; (2) displaying neither the field value nor the field corresponding to the field value.

Field values with and without the modification permission also need to be differentiated during display. For example, a field value without the modification permission is displayed as gray shading, as shown in FIG. 8.

Specifically, one form includes basic fields and detail fields. The detail fields are column names on a detail list in the form. For example, in an order form, basic fields include order number, customer name, customer address, phone number, contact, industry of the client, and so on; detail fields include product model, product quantity, product unit price, and so on.

Preferably, when an operator authorizes operation permissions of form-field values, the basic fields and detail fields can be differentiated during display, so as to be distinguished by the operator during authorization. As shown in FIG. 5 to FIG. 7, the basic fields: order number, customer name, customer address, phone number, contact, and industry of the client, may be displayed in a normal font, and the detail fields: product model, product quantity, and product unit price are displayed in italics type.

Embodiment 4

In this embodiment, the method for authorizing operation permissions of form-field values further includes a template authorization step that specifically includes: (1) selecting a grantee and a form to be authorized, where one or more roles are selected as the grantee; (2) authorizing the grantee: selecting an existing role or a created template as an authorization template, and giving the operation permissions of form-field values in the authorization template to the grantee; and (3) obtaining the operation permissions of form-field values of the grantee after the operation permissions are saved with or without modification.

As shown in FIG. 7, in the template authorization method, a grantee, clerk 1 (Zhang San), is selected first, a form "order form" to be authorized is selected, a created template 1 is selected as an authorization template, the operation permissions of form-field values in the created template 1 are used as the field-value operation permissions of the clerk 1 (Zhang San), and the operation permissions of form-field values of the clerk 1 (Zhang San) are obtained after the operation permissions of form-field values in the created template 1 are saved with or without modification.

In this method, multiple authorized roles can be selected at the same time to batch authorization, thus improving the authorization efficiency. In addition, this method supports template authorization, that is, selecting an existing role or a created template as an authorization template, and directly assigning (updating) the operation permissions of form-field values in the authorization template to the grantee (saved after simple modification). The authorization operation is simple and efficient. Two methods are combined, so that the authorization efficiency of operation permissions of form-field values in a system is greatly improved.

Embodiment 5

In this embodiment, an operation permission is selected first, and then a field having the operation permission is set.

A method for authorizing operation permissions of form-field values includes a step of authorizing operation permissions of form-field values and a step of selecting a grantee, wherein there is no sequence relation between the step of authorizing operation permissions of form-field values and the step of selecting a grantee. The step of authorizing operation permissions of form-field values includes the following steps: S1: selecting a form to be authorized; S2: selecting an operation permission to be authorized; and S3: setting a field in a form that has the selected operation permission, so that the set field has the selected operation permission (that is, having the corresponding operation permission for a field value of the field); the grantee is one or more roles, the role is an independent individual rather than a group or class, one role can only be related to a unique user during the same period, and one user is related to one or more roles.

The above is only a preferred embodiment of the present invention, and it should be understood that the present invention is not limited to the forms disclosed herein, and is not to be construed as being limited to the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for authorizing one or more operation permissions of one or more form-field values in a form, comprising:
    setting the one or more operation permissions of the one or more form-field values comprising:
        selecting the form to be authorized, and displaying the one or more form fields in the form that need operation permission control;
        setting the one or more operation permissions for each form-field value of the one or more form fields respectively; and
        selecting a grantee for an operation permission for a form-field value, and said grantee comprises one or more roles, wherein one role is independent which is not a group or class, the one role is configured to be related to a user only during a same period, and the user is configured to be related to the one or more roles, and the user is configured to obtain one or more operation permissions of the related one role or more roles;
    wherein there is no sequence relation between setting the one or more operation permissions of the one or more form-field values and selecting the grantee.

2. The method according to claim 1, wherein said one or more operation permissions comprise one of or both of a viewing permission and a modification permission.

3. The method according to claim 2, wherein for a field value that does not have the viewing permission, the method further comprising:
    displaying the form field corresponding to the field value that does not have the viewing permission, but hiding the field value that does not have the viewing permission; or
    displaying neither the field value nor the form field corresponding to the field value that does not have the viewing permission.

4. The method according to claim 1, wherein when only one grantee is selected, and when the form to be authorized is selected, an operator who has last authorized one or more field values of the form to the grantee and an operation time are displayed.

5. The method according to claim 1, wherein the role belongs to a department, the role is unique under the department, the role is authorized according to work content of the role.

6. The method according to claim 5, wherein a name of said role is unique under the department, and a number of the role is unique in a system.

7. The method according to claim 5, wherein when the user is transferred across departments, the user's relation to the role in an original department is canceled, and the user is related to a role in a new department.

8. The method according to claim 1, further comprising creating an authorization template:
    selecting the grantee and an authorized form, selecting one or more roles as the grantee;
    authorizing the grantee by selecting an existing role or a preset template, and giving the operation permissions of form-field values of the existing role or the preset template to the grantee; and
    saving the operation permissions of form-field values of the grantee with or without modification as the authorization template for the grantee.

9. The method according to claim 6, wherein when the user is transferred across departments, the user's relation to the role in an original department is canceled, and the user is related to a role in a new department.

10. A method for authorizing one or more operation permissions of one or more form-field values in a form, comprising:
    setting the one or more operation permissions of the one or more form-field values comprising:
        selecting a form to be authorized;
        selecting an operation permission; and
        setting selecting a field in the form and configuring the selected filed to have the selected operation permission, so that one or more form-filed values of the selected field have the selected operation permission; and
    selecting a grantee for the operation permission for a form-field value of the selected filed, and said grantee comprises one or more roles, wherein one role is independent which is not a group or class, the one role is configured to be related to a user only during a same period, and the user is configured to be related to the one or more roles, and the user is configured to obtain one or more operation permissions of the related one role or more roles;
    wherein there is no sequence relation between setting the one or more operation permissions of the one or more form-field values and selecting the grantee.

\* \* \* \* \*